April 27, 1926.

M. CITERO

CAMERA SUPPORT

Filed June 30, 1924

1,582,381

Mike Citero
INVENTOR.

BY

ATTORNEYS.

Patented Apr. 27, 1926.

1,582,381

UNITED STATES PATENT OFFICE.

MIKE CITERO, OF CHICAGO, ILLINOIS.

CAMERA SUPPORT.

Application filed June 30, 1924. Serial No. 723,332.

*To all whom it may concern:*

Be it known that I, MIKE CITERO, a citizen of the United States, residing at Chicago, in the county of Cook and State of Illinois, have invented new and useful Improvements in Camera Supports, of which the following is a specification.

This invention relates to camera supports, and its object is to eliminate the necessity of the tripod in that connection.

Another object of the invention is to provide a supporting device which enables the camera to be supported from any handy object, such as a tree, post or log.

A further object of the invention is to provide a device of the kind referred to which enables the camera to be swung to and supported in any desired angle or position.

A still further object of the invention is to supply a fixture of this kind which is exceedingly simple in construction and inexpensive to produce.

With the above objects in view, the invention will be given greater detail in the annexed specification and claims, attention also being directed to the accompanying drawing, in which—

Figure 1:
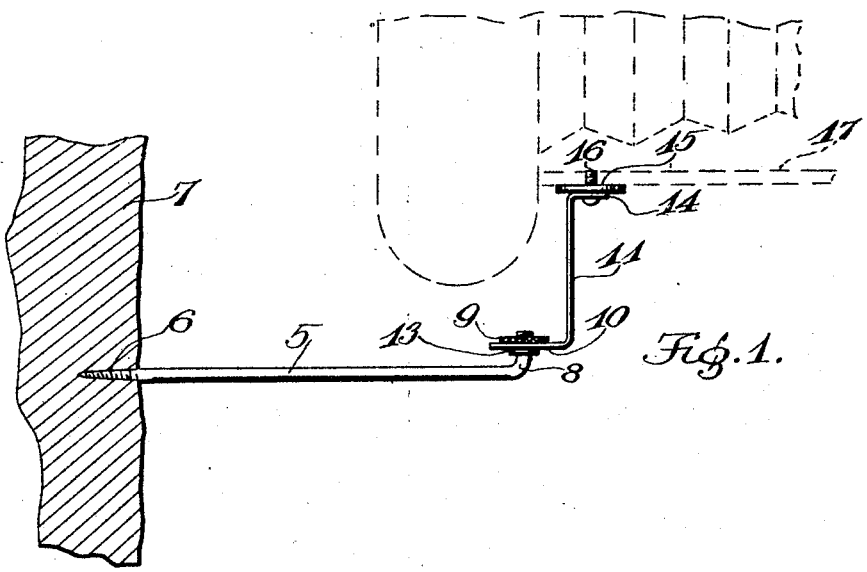
Figure 1 is an elevation of the novel support, showing its application.
Figure 2:
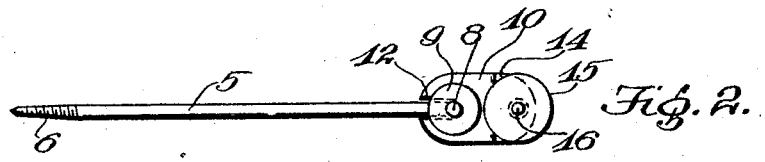
Fig. 2 is a plan view.

Referring specifically to the drawing, 5 denotes the basic element of the novel support, being a long spike with one end formed into a screw 6 for easy application to any handy object, such as a tree 7. The opposite end of the spike is made with a short upward bend 18, which is screw threaded to receive a nut 9. The latter is preferably in the form of a round disk with a knurled periphery for manipulation by hand, and serves to secure the base portion 10 of a bracket 11. Said base portion is made with an open slot 12 to straddle the bend 8, and it is supported in firm position by a collar 13 rigidly secured near the bottom of the bend, so that when the nut 9 is screwed down, the bracket and the spoke will be as one.

The bracket 11 extends upwardly and terminates with a bend 14 in a direction opposite to that of the bend 8. The bend 14 receives a round disk 15 on its upper surface, and a screw 16 is directed through these parts from below to firmly secure them and project a short distance above the disk 15 to receive a typical portable camera 17. The base of such a camera is usually made with a tapped bore to receive an attaching screw carried by the tripod. In the present instance, however, the screw 16 performs this function, so that a few turns of the camera on the bracket enables it to use the latter as a support.

Figure 3:
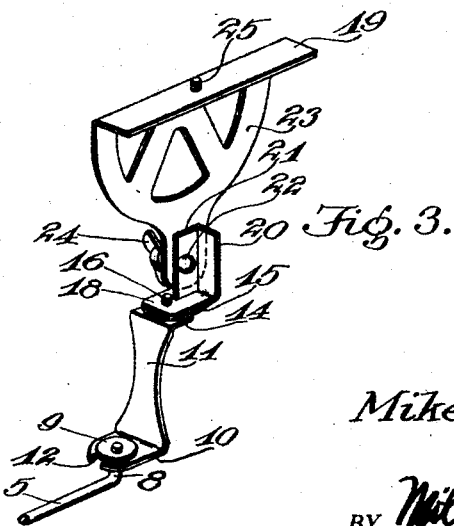
Fig. 3 is a perspective view of a modification.

With the support positioned at the desired height, it will be seen that the adjustment of the nut 9 on the bend 8 enables the bracket 11 to be swung laterally to any desired position consistent with the direction in which the camera is to point. When such an adjustment has been made, a slight further variation of the camera may be made, if desired, by giving the camera a slight twist on its pivotal attaching screw 16.

Where variations of position are also desired in a vertical direction, the modification of Figure 3 may be employed. The original support is used in its entirety, but an attachment is interposed between the camera and the point at which it formerly applied.

The attachment referred to embodies an angular base plate 18 and a stand 19. One section of the base plate is adapted to seat on the disk 15 of the original bracket 11, and is therefore made with a tapped bore to receive the attaching screw 16, and the other section 20 is made with an inturned wing 21 to reinforce it, said wing being drilled with an aperture to receive a screw 22. The latter passes through the vertical section 23 of the stand 19—such section being positioned next outside the wing 21—and receives a wing nut 24 on the other side. The stand 19 is simply a horizontal bend from the section 23 and is intended as a rest or support for the camera in the same sense as the disk 15 in the original structure. A screw 25 is, of course, tightly threaded through the stand as in the former instance to receive the camera.

The modification thus adds to the dirigible feature of the novel support by enabling the camera to be swung in a vertical plane, by the simple manipulation of the wing nut 24. The entire device may be assembled and used by a novice, since its parts are few and operation practically evident from inspection. When the support is not used, its parts may be readily disassembled and carried in a small envelope or packet inside the camera.

Having described my invention, what I claim as new and patentable is:—

1. A camera support comprising an attaching stem having one end portion extended angularly and provided with a shoulder, a nut threaded on said angularly extended end portion adjacent said shoulder, a bracket having a lower horizontal bifurcated portion straddling the angularly extending end portion of said attaching stem and confined between said nut and said shoulder, said nut being adapted to hold said bracket in an adjusted position about a vertical axis, a disk mounted on the upper portion of said bracket, and an attaching device extending through the upper portion of said bracket and said disk and adapted for engaging a camera at a point spaced from one end thereof, the camera being adjustable in its connection with said disk and said bracket.

2. A camera support comprising a bracket, a connecting member having a base mounted for adjustment about a vertical axis on the upper portion of said bracket, said connecting member being provided with a lateral projecting vertically arranged wing, a second bracket connected for adjustment about a horizontal axis to said wing, the upper portion of said second named bracket being provided with a horizontal support upon which the camera may rest, and means carried by said horizontal support for connecting the same to a camera.

In testimony whereof I affix my signature.

MIKE CITERO.